(12) United States Patent
Gingras

(10) Patent No.: US 10,330,127 B2
(45) Date of Patent: Jun. 25, 2019

(54) CONTROL SYSTEM FOR A FELLING SAW AND METHOD OF CONTROL THEREOF

(71) Applicant: USINAGE G.N. ROY INC., Amos (CA)

(72) Inventor: David Gingras, Amos (CA)

(73) Assignee: USINAGE G.N. ROY INC., Amos (CA)

( * ) Notice: Subject to any disclaimer, the term of this patent is extended or adjusted under 35 U.S.C. 154(b) by 916 days.

(21) Appl. No.: 14/794,366

(22) Filed: Jul. 8, 2015

(65) Prior Publication Data

US 2016/0010664 A1    Jan. 14, 2016

Related U.S. Application Data

(60) Provisional application No. 62/021,908, filed on Jul. 8, 2014.

(51) Int. Cl.
| | |
|---|---|
| *A01G 23/091* | (2006.01) |
| *F15B 11/10* | (2006.01) |
| *F15B 11/04* | (2006.01) |
| *F15B 13/02* | (2006.01) |
| *A01G 23/081* | (2006.01) |
| *B23D 59/00* | (2006.01) |

(52) U.S. Cl.
CPC ............ *F15B 11/10* (2013.01); *A01G 23/081* (2013.01); *A01G 23/091* (2013.01); *B23D 59/001* (2013.01); *F15B 11/04* (2013.01); *F15B 13/026* (2013.01); *F15B 2211/20546* (2013.01); *F15B 2211/505* (2013.01); *F15B 2211/6336* (2013.01); *F15B 2211/6655* (2013.01); *F15B 2211/7058* (2013.01); *F15B 2211/8609* (2013.01)

(58) Field of Classification Search
CPC .... A01G 23/08; A01G 23/081; A01G 23/083; A01G 23/091; A01G 23/093; A01G 23/095
See application file for complete search history.

(56) References Cited

U.S. PATENT DOCUMENTS

| | | | | |
|---|---|---|---|---|
| 6,041,683 | A  * | 3/2000 | Timperi ................. | A01G 23/08 144/34.1 |
| 7,017,460 | B2 * | 3/2006 | Virvalo ................ | A01G 23/091 83/13 |
| 7,992,603 | B2 * | 8/2011 | Pellymonter ........ | A01G 23/081 144/336 |
| 8,571,753 | B2 * | 10/2013 | Robillard .............. | B60W 10/06 172/4.5 |

* cited by examiner

*Primary Examiner* — Matthew Katcoff
(74) *Attorney, Agent, or Firm* — Finch & Maloney PLLC

(57) ABSTRACT

A system for controlling a felling saw in a forestry machine, the felling saw being driven by a hydraulic pump and saw motor circuit. The system includes an instrument for measuring a rotational speed of the felling saw and generating a signal indicative of the rotational speed, a calculator for calculating a power consumption of the hydraulic pump and saw motor circuit adjusted as a function of the signal indicative of said rotational speed, and a controller for adjusting hydraulic settings of the hydraulic pump or/and saw motor circuit based on the calculated power consumption. A method for controlling the felling saw is also disclosed.

8 Claims, 2 Drawing Sheets

CONTROL SYSTEM FOR A FELLING SAW AND METHOD OF CONTROL THEREOF

FIELD OF THE INVENTION

The present invention generally relates to forestry machinery, and is more particularly directed to a control system for a feller buncher saw head and method of control thereof.

BACKGROUND

Feller bunchers are forestry machines that have a saw head at a front of the machine with a spinning disk at the bottom of the saw head. Cutting teeth are mounted around the spinning disk and are spaced apart. The disk is spun up to operating speed by a hydraulic pump and motor circuit. The saw cuts trees by the kinetic energy through inertia of the disk, instead of hydraulic power. Thus, rotational speed of the disk is needed and recovery of rotational speed is important to the ability to cut trees. Cutting pulls down the speed of the saw by consuming its rotational energy. However, the power drawn by the saw from the hydraulic pump and motor circuit, in order to rotate, varies according to the types of trees being cut, climatic conditions (as the presence of snow or ice can further slow down the rotation of the saw), the diameters of the trees and other operational factors. A power profile designed for worst-case conditions in winter can result in over-consumption of power in summer conditions when power demands to rotate the saw are not as great. Unfortunately, known prior art hydraulic pump and motor circuits power profiles are designed for worst-case scenarios and are not easily adaptable to different operational conditions, thus resulting in power losses.

CA2593368A describes a forestry machine with a felling saw that includes a controller receiving an input signal from a sensor providing an indication of the rotational speed of the saw head. The controller actuates a visual indicator to indicate an approximate rotational speed of the saw head. However, this controller does not adjust the power consumption of the hydraulic pump based on this rotational speed reading.

CA2610223A describes a system for measuring a performance of a forestry machine. The system collects data related to the function of a subsystem of the machine and monitors the variation of this data over time. This data is then reported to the user of the machine through graphic presentation or a display module. However, once again, such a system only collects information and does not use this information in order to more efficiently control power demands of the hydraulic pump and motor circuit that drive the rotation of a felling head saw.

Accordingly, there is a need for a control system for a felling saw and method of control thereof that addresses at least one of the above-mentioned problems.

SUMMARY

An object of the invention is to provide a control system for a felling saw that addresses at least one of the above-mentioned needs.

According to the present invention, there is provided a system for controlling a felling saw in a forestry machine, the felling saw being driven by a hydraulic pump and saw motor circuit, the system comprising:

an instrument for measuring a rotational speed of the felling saw and generating a signal indicative of said rotational speed;

a calculator for calculating a power consumption or rotational energy of the saw motor circuit and an adjusted power requirement for the hydraulic pump and saw motor circuit, the power requirement being adjusted as a function of the signal indicative of said rotational speed; and a controller for adjusting hydraulic settings of the hydraulic pump and saw motor circuit based on the calculated adjusted power requirement.

In some implementations, the saw motor is an electrically controlled variable displacement saw motor.

In some implementations, the hydraulic pump is an electrically controlled variable flow pump.

In some implementations, the hydraulic pump is a pressure compensated controlled variable flow pump.

In some implementations, the hydraulic pump is an electrically controlled hydrostatic variable flow pump.

According to the present invention, there is also provided a system for controlling a felling saw in a forestry machine, the felling saw being driven by a hydraulic pump and saw motor circuit, the system comprising:

an instrument for measuring a rotational speed of the felling saw and generating a signal indicative of said rotational speed;

a calculator for calculating an adjusted power requirement for the hydraulic pump and saw motor circuit, the power requirement being adjusted as a function of the signal indicative of said rotational speed; and a controller for adjusting hydraulic settings of the hydraulic pump and saw motor circuit based on the calculated adjusted power requirement.

According to the present invention, there is also provided a method for controlling a felling saw in a forestry machine, the felling saw being driven by a hydraulic pump and saw motor circuit, the method comprising:

measuring a rotational speed of the felling saw and generating a signal indicative of said rotational speed;

calculating a power consumption of the saw motor circuit and an adjusted power requirement for the hydraulic pump and saw motor circuit, the power requirement being adjusted as a function of the signal indicative of said rotational speed; and adjusting hydraulic settings of the hydraulic pump and saw motor circuit based on the calculated adjusted power requirement.

Some objects, advantages and other features will become more apparent upon reading the following non-restrictive description of certain optional configurations, given for the purpose of exemplification only, with reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Furthermore, although the present invention may be used with a feller buncher saw head, for example, it is understood that it may be used with other types of saws, for other purposes. For this reason, expressions such as "felling saw", "forestry machine", etc. as used herein should not be taken as to limit the scope of the present invention to being used with these felling saws in particular. These expressions encompass all other kinds of materials, objects and/or purposes with other types of machines with which the present invention could be used and may be useful.

In addition, although the optional configurations as illustrated in the accompanying drawings comprises various components and although the optional configurations of the control system as shown may consist of certain configurations as explained and illustrated herein, not all of these components are essential and thus should not be taken in their restrictive sense, i.e. should not be taken as to limit the scope of the present disclosure. It is to be understood that other suitable components and cooperations there in between, as well as other suitable configurations may be used for the control system, and corresponding parts, as briefly explained and as can be easily inferred herefrom, without departing from the scope of the disclosure.

Figure 1:
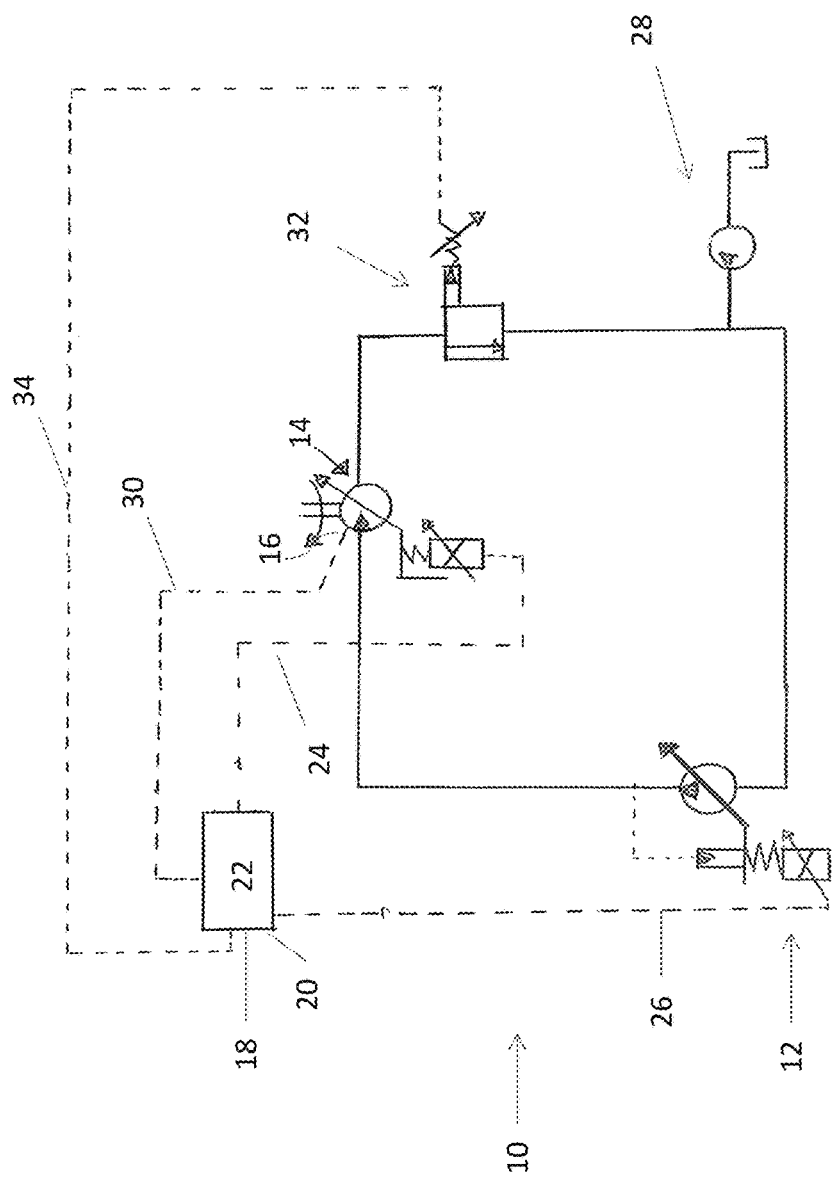
FIG. 1 is a schematic view of a control system for a felling saw, in accordance with an embodiment of the present invention.

Referring to FIG. 1, a control system 10 for controlling a felling saw in a forestry machine is shown. The felling saw is driven by a hydraulic pump 12 and a saw motor 14 circuit. The control system 10 includes an instrument 16 for measuring a rotational speed of the felling saw and generating a signal indicative of the rotational speed. A calculator 20 calculates a power consumption of the saw motor 14 circuit and an adjusted power requirement of the hydraulic pump 12 and saw motor 14 circuit, the power requirement being adjusted as a function of the signal indicative of said rotational speed. A controller 22 adjusts hydraulic settings of the hydraulic pump 12 and saw motor 14 circuit based on the calculated adjusted power requirement. Also, the control system can only adjust the hydraulic motor settings without changing the hydraulic pump settings.

Hence, in certain scenarios, an operator of the felling saw can cut a certain number of trees and accumulate a certain number of cut trees in the felling head. Variations in rotational speed of the saw can be measured during this felling operation. Once a certain capacity of the felling head has been reached, the operator typically transfers the accumulated cut trees from the felling head to the ground. During this pause in the cutting operation, an updated power requirement can thus be calculated based on the rotational speed variations that previously occurred. A new felling sequence can then be initiated with the saw motor drawing upon the updated power requirement being provided to the pump and motor circuit, therefore probably reducing the consumption of power.

In some implementations, the saw motor 14 is an electrically controlled variable displacement saw motor. The controller 22 is connected to the saw motor 14 through an output signal circuit 24. An input signal circuit 30 connects the instrument 16 to the controller 22 and calculator 20.

In some implementations, as shown in FIG. 1, the hydraulic pump 12 is an electrically controlled hydrostatic variable flow pump. The controller 22 is connected to the hydrostatic variable flow pump 12 through an output signal circuit 26. The pump circuit also includes a boosting pump 28. In some implementations, an anti-cavitation valve 32 is provided to react when hydraulic power to the saw motor 14 is cut or adjusted. Cavitation occurs when the volume of hydraulic fluid demanded by the saw motor exceeds the volume of fluid being supplied. A valve control signal circuit 34, such as an open/closed, on/off, or proportional circuit, among others, connects the valve 32 to the controller 22.

Figure 2:
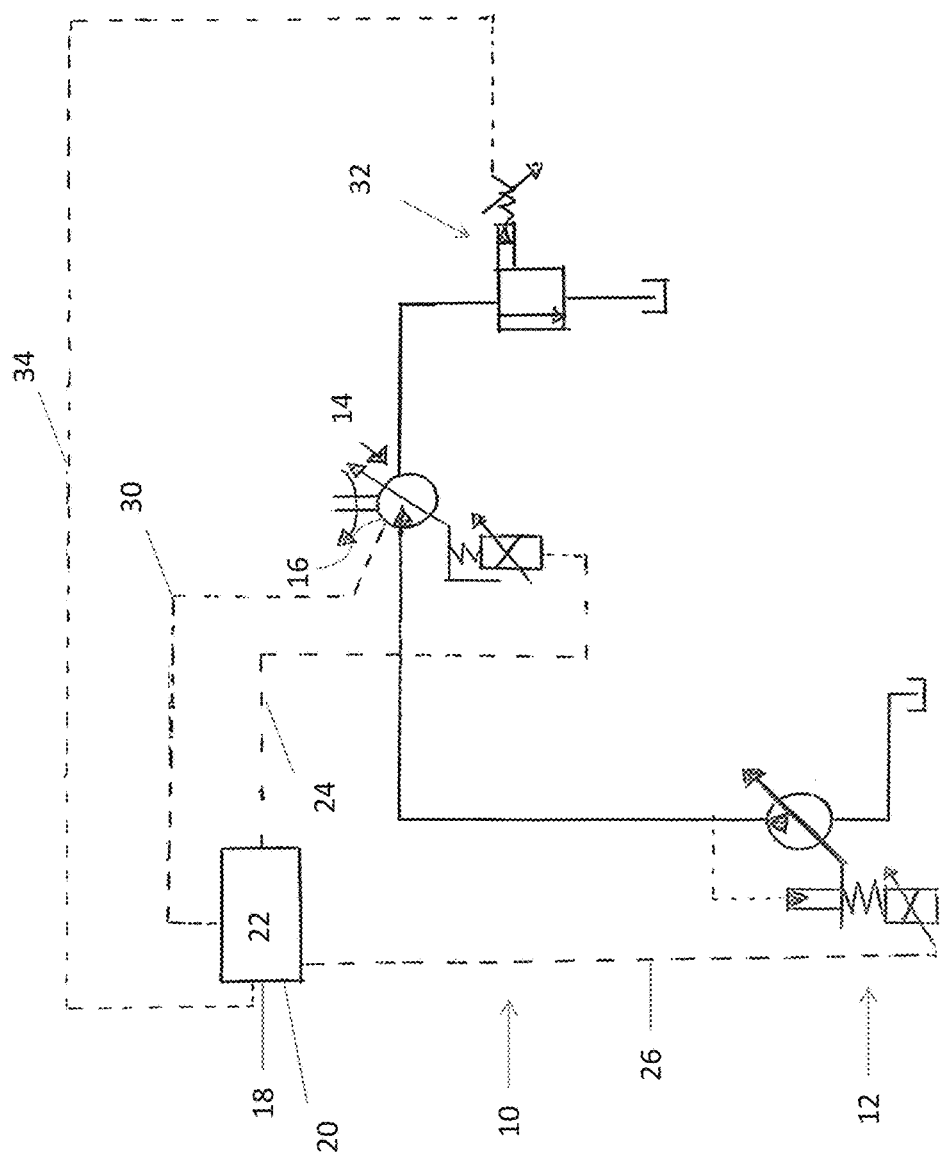
FIG. 2 is a schematic view of a control system for a felling saw, in accordance with another embodiment of the present invention.

In some implementations, as shown in FIG. 2, the hydraulic pump 12 is an electrically controlled variable flow pump.

In some implementations, as shown in FIG. 2, the hydraulic pump 12 is a pressure compensated controlled variable flow pump.

According to the present invention, there is also provided a method for controlling a felling saw in a forestry machine, the felling saw being driven by a hydraulic pump and saw motor circuit, the method comprising:

measuring a rotational speed of the felling saw and generating a signal indicative of said rotational speed;

calculating a power consumption of the saw motor circuit and an adjusted power requirement for the hydraulic pump and saw motor circuit, the power requirement being adjusted as a function of the signal indicative of said rotational speed; and adjusting hydraulic settings of the hydraulic pump and saw motor circuit based on the calculated adjusted power requirement.

The system can thus optimize cutting performance according to different parameters (including climate, type and size of wood, type of forestry machines), reduce fuel consumption, reduce time lost to waiting for an optimal saw rotation speed and monitor the wear of hydraulic components.

The system integrates a controller, software, one or more instruments or sensors, a variable flow and pressure pump and a variable displacement hydraulic motor to rotate a saw, by varying hydraulic power. The pump or/and motor are controlled through electrical signals from the controller. This system can limit hydraulic power required for cutting trees while continuously adjusting hydraulic settings (flow/pressure). The system can reduce the cost of operating a felling saw, since it will be more efficient and consume less energy. The system will also upgrade the cutting quality by operating with a more constant saw knife linear speed. Cutting quality is very important for the saw mills to optimise wood fiber recovery.

The hydraulic components used with the control system can be standard hydraulic components, but that are controlled electrically instead of hydraulically. The controller and calculator are provided with sufficient computing power to receive the signals from the instruments or sensors, process them and then send output signals to the hydraulic pump or/and saw motor. Woodcutting experiments can be done to adjust the variable control parameters of the controller that are integrated and derived by the calculator.

The system and method allow the mechanical and hydraulic components to adjust to different operational conditions and optimize performance when cutting trees. The system can decrease fuel consumption. Certain mechanical components can also have increased service life through a better optimized use thereof. The state of hydraulic components can be known by storing the operational history of the components in the controller and memory. Any lack of performance in operation of the saw can be reduced as the hydraulic system is properly adjusted as a function of different operational conditions.

In some implementations, the controller 22 can also send control signals to the diesel engine driving the hydraulics of the machine so that the diesel engine is properly prompted to react to any changes in the power requirements that get adjusted during operation of the felling machine.

In some implementations, the controller 22 can control the saw under different modes of operation. For example, at least two different modes can be provided, such a maximum power mode and an "economy" mode. The maximum power mode can be activated when the operator is faced with an unusually large tree to cut after felling a number of smaller trees, as the calculated adjusted power requirement can be insufficient for a larger tree as the requirement is based on the previous felling of smaller trees. The "economy" mode can be essentially based on the above-described method for adjusting to different operational conditions and decreasing fuel consumption.

In some embodiments, the system can further comprise a memory or a computer linked to the controller for keeping in memory the signal indicative of said rotational speed or any other operational parameters mentioned above.

In some embodiments, the system can further comprise other sensors, such as pressure sensors, that generate other operational parameter signals that can be used by the calculator and controller to further adjust, as required, hydraulic settings of the hydraulic pump and saw motor circuit.

Of course, numerous modifications could be made to the above-described configurations without departing from the scope of the disclosure.

The invention claimed is:

1. A method for controlling a felling saw in a forestry machine during felling operation, the felling saw being driven by a hydraulic pump and saw motor circuit, the method comprising:
   measuring a variation in rotational speed of the felling saw during a felling sequence thereof and generating a signal indicative of said variation in rotational speed;
   calculating a power consumption of the saw motor circuit during the felling sequence and an adjusted power requirement for the hydraulic pump and saw motor circuit for a subsequent felling sequence, the power requirement being adjusted as a function of the signal indicative of said variation in rotational speed;
   adjusting hydraulic settings of the hydraulic pump and saw motor circuit based on the calculated adjusted power requirement; and
   initiating the subsequent felling sequence with the adjusted hydraulic settings.

2. The method according to claim 1, wherein the saw motor is an electrically controlled variable displacement saw motor.

3. The method according to claim 1, wherein the hydraulic pump is an electrically controlled variable flow pump.

4. The method according to claim 1, wherein the hydraulic pump is an electrically controlled hydrostatic variable flow pump.

5. The method according to claim 1, wherein the hydraulic pump is a pressure compensated controlled variable flow pump.

6. The method according to claim 1, further comprising the step of keeping in memory the signal indicative of said variation in rotational speed.

7. The method according to claim 1, wherein each felling sequence includes cutting trees until a felling head of the forestry machine has reached a predetermined capacity, and wherein the method further comprises the step of unloading the felling head once it has reached the predetermined capacity.

8. The method according to claim 7, wherein the step of adjusting hydraulic settings of the hydraulic pump and/or saw motor circuit is done during the step of unloading the felling head.

* * * * *